Patented Aug. 31, 1937

2,091,345

UNITED STATES PATENT OFFICE 2,091,345

ACCELERATOR FOR THE VULCANIZATION OF RUBBER

Ira Williams, Woodstown, N. J., assignor to E. I. du Pont de Nemours & Company, Wilmington, Del., a corporation of Delaware No Drawing. Application November 9, 1934, Serial No. 752,260

12 Claims. (Cl. 18—53)

This invention relates to accelerators for the vulcanization of rubber and more particularly to the method of vulcanizing rubber and the products obtained thereby.

The use of various salts of mercapto benzothiazole has been proposed for accelerating the vulcanization of rubber. U. S. Patent 1,544,687 discloses the zinc salt of mercapto benzothiazole and Patent 1,544,688 discloses the corresponding lead salt. Patent 1,591,441 proposes the use of zinc, lead, cadmium or mercury salts of 4,5-disubstituted - 2 - mercapto thiazoles. Patent 1,604,199 mentions zinc, lead, cadmium and mercury salts of methyl, dimethyl and methoxy substituted mercapto benzothiazole as possible accelerators. These various salts of the mercapto arylenethiazoles are extremely active accelerators even at low temperatures of 110° C. and below. This is a disadvantageous feature of these accelerators as they tend to cause prevulcanization or scorching of the rubber during processing operations in which the temperatures often reach as high as 110° C. Such prevulcanization or scorching reduces the physical properties of the final product which final products are less satisfactory for commercial use.

An object of the present invention is to provide a new class of salts of mercapto arylenethiazole accelerators which are satisfactorily inactive at low temperatures but become very active at the high vulcanizing temperatures. A further object is to provide a method for vulcanizing rubber whereby the danger of prevulcanization and scorching is largely obviated. Still further objects are to provide new compositions of matter and to advance the art. Other objects will appear hereinafter.

These objects may be accomplished in accordance with my invention which comprises employing, as accelerators for the vulcanization of rubber, alkaline earth salts of 1-mercapto arylenethiazole accelerators. The salts of the alkaline earth group, barium, strontium, calcium and magnesium, are relatively inactive at temperatures up to about 110° C. but are very active at the ordinary higher vulcanizing temperatures and are free from any discoloring effect on the rubber.

The barium, strontium, calcium or magnesium salts of the 1-mercapto arylenethiazole may be prepared by the treatment of the mercaptan with the alkaline earth hydroxide in water or other suitable solution. The resulting salt may be recovered by filtration or, in the case of the formation of soluble products, by evaporation of the solvent. In general, it has been found that the water solubility of the alkaline earth salts of the mercapto arylenethiazoles increase as the molecular weight of the alkaline earth decreases.

The barium salt of 1-mercapto benzothiazole has been prepared by dissolving 157 parts of barium hydroxide Ba(OH)$_2$8H$_2$O in 500 parts of water. This was added at 90° C. to 167 parts of 1-mercapto benzothiazole slurried in an equal weight of water. The addition of barium hydrate was discontinued when the solution became slightly alkaline to Clayton yellow paper. The material was then cooled to 10° C. and the barium salt recovered by filtration. The product is a pale yellow material slightly soluble in water and alcohol and melting at 270–280° C. The vulcanizing characteristics of my compounds were compared with the corresponding zinc salt by incorporating them in mixes of the following composition.

| | |
|---|---|
| Rubber | 100 |
| Carbon black | 25 |
| Zinc oxide | 5 |
| Sulfur | 3 |
| Stearic acid | 3 |
| Salt of 1-mercapto benzo-thiazole | 1 |

These rubber mixes were vulcanized at 227° F. and at 294° F. for periods of 30 and 60 minutes. The results are shown in the following table.

*Physical properties when vulcanized at 227° F.*

| Salt | Minutes vulcanized | Lbs./in² load at an elongation of 500% | Lbs./in² tensile at break |
|---|---|---|---|
| Zinc | 30 | 425 | 1,260 |
| Do | 60 | 950 | 1,975 |
| Barium | 30 | Not vulcanized | Not vulcanized |
| Do | 60 | ----do---- | Do. |
| Magnesium | 30 | ----do---- | Do. |
| Do | 60 | ----do---- | Do. |

*Physical properties when vulcanized at 294° F.*

| Salt | Minutes vulcanized | Lbs./in² load at an elongation of 500% | Lbs./in² tensile at break |
|---|---|---|---|
| Zinc | 20 | 1,375 | 2,550 |
| Do | 60 | 2,050 | 3,325 |
| Barium | 20 | 1,375 | 2,525 |
| Do | 60 | 1,950 | 3,275 |
| Magnesium | 20 | 1,120 | 2,300 |
| Do | 60 | 1,775 | 3,150 |

These tests clearly indicate that the alkaline earth salts are much less effective at low temperatures than the salts previously known but become very effective when the higher vulcanizing temperatures are employed.

While I prefer to employ the barium salts of the 1-mercapto arylene-thiazole accelerators and particularly the barium salt of 1-mercapto benzothiazole, the corresponding strontium, calcium and magnesium salts are also effective and fall within the broader scope of my invention.

Other 1-mercapto arylenethiazoles such as those prepared from ortho and para toluidine or from alpha or beta naphthylamine by heating with carbon disulfide and sulphur may be employed. Among the other 1-mercapto arylenethiazoles which may be specifically mentioned are:

1-mercapto-3-methyl benzothiazole
1-mercapto-4-methyl benzothiazole
1-mercapto-5-methyl benzothiazole
1-mercapto-3:5-dimethyl benzothiazole
1-mercapto-5-ethoxy benzothiazole
1-mercapto-5-methoxy benzothiazole
1-mercapto-amino benzothiazole
1-mercapto naphthothiazoles While I have disclosed the preferred embodiments of my invention it will be readily apparent to those skilled in the art that many variations and modifications may be made therein and in the proportions employed without departing from the spirit of my invention which is to be limited solely by the appended claims construed as broadly as is permissible in view of the prior art.

I claim:

1. The method of vulcanizing rubber which comprises incorporating in a rubber mix an alkaline earth salt of a 1-mercapto arylene thiazole.

2. The method of vulcanizing rubber which comprises incorporating in a rubber mix an alkaline earth salt of a 1-mercaptobenzothiazole.

3. The method of vulcanizing rubber which comprises incorporating in a rubber mix an alkaline earth salt of 1-mercapto benzothiazole.

4. The method of vulcanizing rubber which comprises incorporating in a rubber mix a barium salt of a 1-mercapto arylene thiazole.

5. The method of vulcanizing rubber which comprises incorporating in a rubber mix a barium salt of a 1-mercapto benzothiazole.

6. The method of vulcanizing rubber which comprises incorporating in a rubber mix the barium salt of 1-mercapto benzothiazole.

7. Rubber having incorporated therein as a vulcanization accelerator an alkaline earth salt of a 1-mercapto arylene thiazole.

8. Rubber having incorporated therein as a vulcanization accelerator an alkaline earth salt of a 1-mercapto benzothiazole.

9. Rubber having incorporated therein as a vulcanization accelerator an alkaline earth salt of 1-mercapto benzothiazole.

10. Rubber having incorporated therein as a vulcanization accelerator a barium salt of a 1-mercapto arylene thiazole.

11. Rubber having incorporated therein as a vulcanization accelerator a barium salt of a 1-mercapto benzothiazole.

12. Rubber having incorporated therein as a vulcanization accelerator the barium salt of 1-mercapto benzothiazole.

IRA WILLIAMS.